US012219565B2

(12) United States Patent
Yang

(10) Patent No.: US 12,219,565 B2
(45) Date of Patent: Feb. 4, 2025

(54) BUFFER INDICATION METHODS AND APPARATUSES, RESOURCE TRANSMISSION METHODS AND APPARATUSES AND USER EQUIPMENT

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 452 days.

(21) Appl. No.: 17/588,833

(22) Filed: Jan. 31, 2022

(65) Prior Publication Data

US 2022/0159697 A1    May 19, 2022

Related U.S. Application Data

(63) Continuation of application No. PCT/CN2019/099592, filed on Aug. 7, 2019.

(51) Int. Cl.
*H04W 72/21* (2023.01)
*H04W 72/566* (2023.01)
(Continued)

(52) U.S. Cl.
CPC ......... *H04W 72/21* (2023.01); *H04W 72/569* (2023.01); *H04W 80/02* (2013.01); *H04W 92/18* (2013.01)

(58) Field of Classification Search
CPC ... H04W 72/21; H04W 72/569; H04W 80/02; H04W 92/18; H04W 28/0278
See application file for complete search history.

(56) References Cited

U.S. PATENT DOCUMENTS 10,165,573 B2    12/2018 Lee et al.
10,582,516 B2    3/2020 Worrall et al.
(Continued)

FOREIGN PATENT DOCUMENTS

CN    106105306 A    11/2016
CN    107079473 A    8/2017
(Continued)

OTHER PUBLICATIONS

ISA State Intellectual Property Office of the People's Republic of China, International Search Report Issued in Application No. PCT/CN2019/099592, Apr. 26, 2020, WIPO, 5 pages.
(Continued)

*Primary Examiner* — Kiet Tang
(74) *Attorney, Agent, or Firm* — Volpe Koenig

(57) ABSTRACT

The present disclosure provides buffer indication methods, resource transmission methods, user equipments, base stations and computer readable storage media. The buffer indication method includes: when a to-be-sent first and second BSR are present at the same time, determining that an uplink MAC PDU is incapable of carrying both a first and second BSR MAC CE at the same time, adding an indication MAC CE to the uplink MAC PDU and sending the MAC PDU with the MAC CE to a base station. The MAC CE indicates that a UE has a to-be-sent BSR; receiving information on an uplink resource sent by the base station to the UE based on the MAC CE; sending a to-be-sent BSR MAC CE to the base station based on the uplink resource; receiving information on a transmission resource of a corresponding type sent by the base station to the UE based on the to-be-sent BSR.

12 Claims, 5 Drawing Sheets

(51) Int. Cl.
    *H04W 80/02*     (2009.01)
    *H04W 92/18*     (2009.01)

(56) References Cited

U.S. PATENT DOCUMENTS

| | | | |
|---|---|---|---|
| 2012/0099452 A1* | 4/2012 | Dai | H04W 72/1221 |
| | | | 370/252 |
| 2014/0064219 A1* | 3/2014 | Quan | H04W 72/21 |
| | | | 370/329 |
| 2016/0374110 A1* | 12/2016 | Lee | H04W 72/51 |
| 2017/0006628 A1* | 1/2017 | Takahashi | H04L 69/28 |
| 2017/0245294 A1 | 8/2017 | Worrall et al. | |
| 2019/0104474 A1 | 4/2019 | Raghunathan et al. | |
| 2020/0245188 A1 | 7/2020 | Zhang et al. | |

FOREIGN PATENT DOCUMENTS

| | | |
|---|---|---|
| CN | 109548080 A | 3/2019 |
| CN | 110022578 A | 7/2019 |

OTHER PUBLICATIONS

Huawei et al. "Further Discussion on SR Configuration and Procedure for NR SL Mode-1" 3GPP TSG-RAN WG2 #106 R2-1907450, May 2, 2019 (May 2, 2019), 9 pages.

\* cited by examiner

BUFFER INDICATION METHODS AND APPARATUSES, RESOURCE TRANSMISSION METHODS AND APPARATUSES AND USER EQUIPMENT

CROSS-REFERENCE TO RELATED APPLICATION

The present application is a continuation of International Application No. PCT/CN2019/099592 filed on Aug. 7, 2019, which is incorporated herein by reference in its entirety.

TECHNICAL FIELD

The present disclosure relates to the field of communication technologies, and in particular to buffer indication methods and apparatuses, resource transmission methods and apparatuses, user equipments, base stations and computer readable storage media.

BACKGROUND

In the era of the fourth generation mobile communication technology (4G for short), in order to support direct communication between user equipments (UEs), a sidelink communication manner is introduced. In the sidelink communication manner, an interface between UEs is a short-distance direct communication interface (e.g., PC-5). In the sidelink transmission, addressing is achieved by using a source identifier and a target identifier at a Media Access Control (MAC) layer, thus eliminating the need of establishing a connection prior to transmission.

When a network is needed to schedule a transmission resource, a UE needs to report a buffer status report (BSR) carrying to-be-sent data amounts in different logical channel groups, and the network determines an amount of transmission resources to be scheduled for the UE based on the BSR.

The UE needs different transmission resources to send uplink data and sidelink data, uplink to-be-sent data can trigger a BSR, and sidelink to-be-sent data can trigger a sidelink BSR.

A BSR is carried by a MAC control element (CE), and each MAC CE has one corresponding MAC subheader. Each MAC subheader carries information such as a logical channel identifier (LCID), a length, a format, and so on. Some MAC CEs have a length of zero bit and are indicated implicitly by the MAC subheader carrying a specific LCID.

When assembling an uplink MAC protocol data unit (PDU), in an order of priority, a BSR MAC CE, a sidelink BSR MAC CE and an uplink data service data unit (SDU) may be placed into the MAC PDU sequentially.

In the era of the fifth generation mobile communication technology (5G for short), sidelink communication supports an enhanced vehicle to everything (V2X) service and uplink communication supports an ultra-reliable low latency communication (URLLC) service. When assembling an uplink MAC PDU, the placing priority may be adjusted dynamically according to a priority of data.

When the UE has a to-be-sent BSR and a to-be-sent sidelink BSR at the same time, if the sidelink BSR is preferentially placed into the MAC PDU for transmission, and there is no space for carrying the BSR, a network does not know that the UE still has the to-be-sent BSR. In this case, the network only schedules a transmission resource for the sidelink. In this way, the BSR cannot be reported at this time, and the BSR is reported again until a BSR retransmission timer expires, leading to increased delay in the uplink service.

When the UE has a to-be-sent BSR and a to-be-sent sidelink BSR at the same time, if a BSR corresponding to uplink data is preferentially placed into the MAC PDU for transmission, and there is no space for carrying the sidelink BSR, the network does not know that the UE still has the to-be-sent sidelink BSR. In this case, the network does not continue scheduling an uplink transmission resource for the to-be-sent sidelink BSR. In this way, the sidelink BSR cannot be reported at this time, and the sidelink BSR is reported again until a sidelink BSR retransmission timer expires, leading to increased delay in the sidelink service.

SUMMARY

In view of this, the present disclosure provides buffer indication methods and apparatuses, resource transmission methods and apparatuses, user equipments, base stations, computer readable storage media, so as to reduce delay of data transmission.

According to a first aspect of embodiments of the present disclosure, there is provided a buffer indication method, which is applied to a user equipment (UE). The method includes:
  when a to-be-sent first buffer state report (BSR) and a to-be-sent second BSR are present at the same time, in response to determining that an uplink media access control (MAC) protocol data unit (PDU) is incapable of carrying both a first BSR MAC control element (CE) and a second BSR MAC CE at the same time, adding an indication MAC CE to the uplink MAC PDU and sending the MAC PDU added with the indication MAC CE to a base station, where the indication MAC CE indicates that the UE has a to-be-sent BSR, the first BSR MAC CE carries the first BSR, and the second BSR MAC CE carries the second BSR;
  receiving information on an uplink resource sent by the base station to the UE based on the indication MAC CE;
  sending a to-be-sent BSR MAC CE to the base station based on the uplink resource, the to-be-sent BSR MAC CE carries the to-be-sent BSR; and
  receiving information on a transmission resource of a corresponding type sent by the base station to the UE based on the to-be-sent BSR.

In an embodiment, determining that the uplink media access control (MAC) protocol data unit (PDU) is incapable of carrying both the first BSR MAC control element (CE) and the second BSR MAC CE at the same time includes:
  based on a descending order of priorities of logical channels for triggering the first BSR and the second BSR, adding a corresponding MAC CE to the MAC PDU;
  in response to determining that a space of the MAC PDU is insufficient to carry both the first BSR MAC CE and the second BSR MAC CE at the same time, determining that the MAC PDU is incapable of carrying both the first BSR MAC CE and the second BSR MAC CE at the same time.

In an embodiment, the to-be-sent BSR includes the first BSR or the second BSR; when the first BSR is a sidelink BSR, the second BSR is an uplink BSR; or, when the first BSR is an uplink BSR, the second BSR is a sidelink BSR.

In an embodiment, the UE having the to-be-sent BSR is indicated by a MAC subheader corresponding to the indication MAC CE and including a preset logical channel identifier (LCID).

According to a second aspect of embodiments of the present disclosure, there is provided a resource transmission method, which is applied to a base station. The method includes:

receiving a media access control (MAC) protocol data unit (PDU) from a user equipment (UE);

in response to obtaining an indication MAC control element (CE) from the MAC PDU, sending information on an uplink resource to the UE based on the indication MAC CE, where the indication MAC CE indicates that the UE has a to-be-sent BSR;

receiving a to-be-sent BSR MAC CE sent by the UE based on the uplink resource, and obtaining the to-be-sent BSR from the to-be-sent BSR MAC CE; and sending information on a transmission resource of a corresponding type to the UE based on the obtained to-be-sent BSR.

In an embodiment, the to-be-sent BSR includes a first BSR or a second BSR; when the first BSR is a sidelink BSR, the second BSR is an uplink BSR; or, when the first BSR is an uplink BSR, the second BSR is a sidelink BSR.

In an embodiment, the UE having the to-be-sent BSR is indicated by a MAC subheader corresponding to the indication MAC CE and including a preset logical channel identifier (LCID).

According to a third aspect of embodiments of the present disclosure, there is provided a user equipment (UE), including:

a processor; and a memory storing instructions executable by the processor;

where the processor is configured to:

when a to-be-sent first buffer state report (BSR) and a to-be-sent second BSR are present at the same time, in response to determining that an uplink media access control (MAC) protocol data unit (PDU) is incapable of carrying both a first BSR MAC control element (CE) and a second BSR MAC CE at the same time, add an indication MAC CE in the uplink MAC PDU and send the MAC PDU added with the indication MAC CE to a base station, where the indication MAC CE indicates that the UE has a to-be-sent BSR, the first BSR MAC CE carries the first BSR, and the second BSR MAC CE carries the second BSR;

receive information on an uplink resource sent by the base station to the UE based on the indication MAC CE;

based on the uplink resource, send a to-be-sent BSR MAC CE to the base station, where the to-be-sent BSR MAC CE carries the to-be-sent BSR; and receive information on a transmission resource of a corresponding type sent by the base station to the UE based on the to-be-sent BSR.

In an embodiment, determining that the uplink MAC PDU is incapable of carrying both the first BSR MAC CE and the second BSR MAC CE at the same time includes:

based on a descending order of priorities of logical channels for triggering the first BSR and the second BSR, adding a corresponding MAC CE to the MAC PDU;

in response to determining that a space of the MAC PDU is insufficient to carry both the first BSR MAC CE and the second BSR MAC CE at the same time, determining that the MAC PDU is incapable of carrying both the first BSR MAC CE and the second BSR MAC CE at the same time.

In an embodiment, the to-be-sent BSR includes a first BSR or a second BSR; when the first BSR is a sidelink BSR, the second BSR is an uplink BSR; or, when the first BSR is an uplink BSR, the second BSR is a sidelink BSR.

In an embodiment, the UE having the to-be-sent BSR is indicated by an MAC subheader corresponding to the indication MAC CE and including a preset logical channel identifier (LCID).

According to a fourth aspect of embodiments of the present disclosure, there is provided a base station, including:

a processor; and a memory storing instructions executable by the processor;

where the instructions are executed by the processor to implement the above resource transmission method.

In an embodiment, the to-be-sent BSR includes a first BSR or a second BSR; when the first BSR is a sidelink BSR, the second BSR is an uplink BSR; or, when the first BSR is an uplink BSR, the second BSR is a sidelink BSR.

In an embodiment, the UE having the to-be-sent BSR is indicated by an MAC subheader corresponding to the indication MAC CE and including a preset logical channel identifier (LCID).

According to a fifth aspect of embodiments of the present disclosure, there is provided a non-transitory computer readable storage medium, storing computer instructions, where the instructions are executed by a processor to implement the above buffer indication method.

According to a sixth aspect of embodiments of the present disclosure, there is provided a non-transitory computer readable storage medium, storing computer instructions, where the instructions are executed by a processor to implement the above resource transmission method.

The technical solutions provided by the embodiments of the present disclosure have the following beneficial effects.

When the first BSR and the second BSR to be sent are present at the same time, in response to determining that the uplink MAC PDU is incapable of carrying both the first BSR MAC CE and the second BSR MAC CE at the same time, an indication MAC CE is added to the uplink MAC PDU and the MAC PDU added with the indication MAC CE is sent to a base station. In this way, the base station may schedule an uplink resource for the UE based on the indication MAC CE, and the UE sends a to-be-sent BSR MAC CE to the base station based on the uplink resource, and thus the base station can send information on a transmission resource of a corresponding type to the UE based on the to-be-sent BSR, thereby reducing data transmission delay.

The base station obtains the indication MAC CE from the MAC PDU and sends information on the uplink resource to the UE based on the indication MAC CE, such that the UE may send a to-be-sent BSR MAC CE to the base station based on the uplink resource and the base station may send information on the transmission resource of a corresponding type to the UE based on the to-be-sent BSR. In this way, the UE may send data based on the transmission resource, thereby reducing data transmission delay.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

DETAILED DESCRIPTION OF THE EMBODIMENTS

Figure 1:
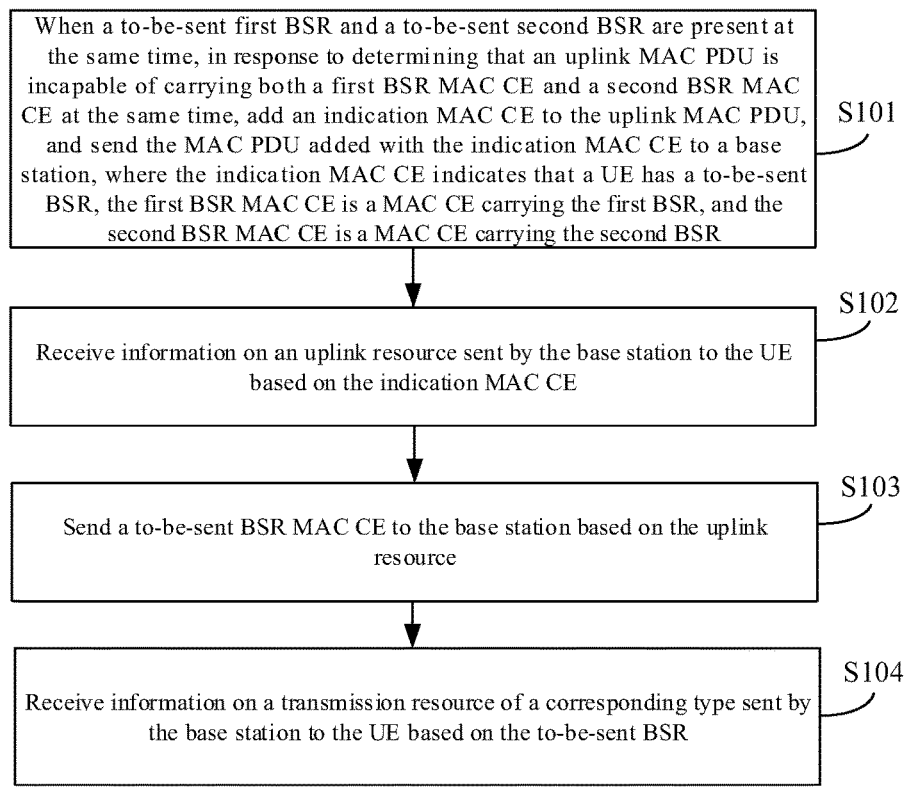
FIG. 1 is a flowchart illustrating a buffer indication method according to an exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The implementations described in the following exemplary embodiments do not represent all implementations consistent with the present disclosure. Rather, they are merely examples of apparatuses and methods consistent with some aspects of the present disclosure as detailed in the appended claims.

FIG. 1 is a flowchart illustrating a buffer indication method according to an exemplary embodiment of the present disclosure. The embodiment is described from the UE side. As shown in FIG. 1, the buffer indication method includes the following.

At step S101, when a to-be-sent first BSR and a to-be-sent second BSR are present at the same time, in response to determining that an uplink MAC PDU is incapable of carrying both a first BSR MAC CE and a second BSR MAC CE at the same time, an indication MAC CE is added to the uplink MAC PDU, and the MAC PDU added with the indication MAC CE is sent to a base station, where the indication MAC CE indicates that a UE has a to-be-sent BSR. The first BSR MAC CE is a MAC CE carrying the first BSR, and the second BSR MAC CE is a MAC CE carrying the second BSR.

The to-be-sent BSR may include the first BSR or the second BSR. The first BSR may be a sidelink BSR or an uplink BSR. When the first BSR is a sidelink BSR, the second BSR is an uplink BSR. When the first BSR is an uplink BSR, the second BSR is a sidelink BSR.

In this embodiment, based on a descending order of priorities of logical channels for triggering the first BSR and the second BSR, a corresponding MAC CE may be added to the MAC PDU. If a space of the MAC PDU is insufficient to carry both the first BSR MAC CE and the second BSR MAC CE at the same time, determining that the MAC PDU is incapable of carrying both the first BSR MAC CE and the second BSR MAC CE at the same time.

In this embodiment, in response to determining that the MAC PDU is incapable of carrying both the first BSR MAC CE and the second BSR MAC CE at the same time, an indication MAC CE is added to the uplink MAC PDU, where the indication MAC CE indicates that the UE has a to-be-sent BSR.

The UE has the to-be-sent BSR is indicated by a MAC subheader corresponding to the indication MAC CE and including a preset logical channel identifier (LCID). A length of the indication MAC CE may be zero bit. The preset LCID may be set to, for example, LCID 10 according to actual requirements.

At step S102, information on an uplink resource sent by the base station to the UE based on the indication MAC CE is received.

After receiving the MAC PDU, the base station obtains the indication MAC CE from the MAC PDU, detects that the UE has the to-be-sent BSR based on the indication MAC CE, and schedules an uplink resource for the UE, the uplink resource may include an uplink resource for transmitting the to-be-sent BSR. Further, after receiving the MAC PDU, the base station obtains the first BSR or the second BSR from the MAC PDU. The base station schedules a corresponding type of transmission resource for the UE based on the obtained first BSR or second BSR, and notifies the UE of information of the scheduled transmission resource.

At step S103, a to-be-sent BSR MAC CE is sent to the base station based on the uplink resource.

In this embodiment, if the to-be-sent BSR MAC CE is the first BSR MAC CE, after the information on the uplink resource (uplink resource information for short) is received from the base station, the first BSR MAC CE is sent to the base station based on the uplink resource which is scheduled for transmitting the first BSR MAC CE and is indicated by the uplink resource information. If the to-be-sent BSR MAC CE is the second BSR MAC CE, after the uplink resource information is received from the base station, the second BSR MAC CE is sent to the base station based on the uplink resource which is scheduled for transmitting the second BSR MAC CE and is indicated by the uplink resource information.

At step S104, information on a transmission resource of a corresponding type sent by the base station to the UE based on the to-be-sent BSR is received.

In this embodiment, if the to-be-sent BSR is a sidelink BSR, the received information on the transmission resource of a corresponding type is information corresponding to a transmission resource for sidelink transmission. If the to-be-sent BSR is an uplink BSR, the received information on the transmission resource of a corresponding type is information corresponding to a transmission resource for uplink transmission.

In this above embodiment, when a to-be-sent first BSR and a to-be-sent second BSR are present at the same time, in response to determining that an uplink MAC PDU is incapable of carrying both a first BSR MAC CE and a second BSR MAC CE at the same time, an indication MAC CE is added to the uplink MAC PDU and the MAC PDU added with the indication MAC CE is sent to a base station. In this way, the base station may schedule an uplink resource for a UE based on the indication MAC CE, and the UE may send a to-be-sent BSR MAC CE to the base station based on the uplink resource, and thus the base station may send information on a transmission resource of a corresponding type to the UE based on a to-be-sent BSR, thereby reducing data transmission delay.

Figure 2:
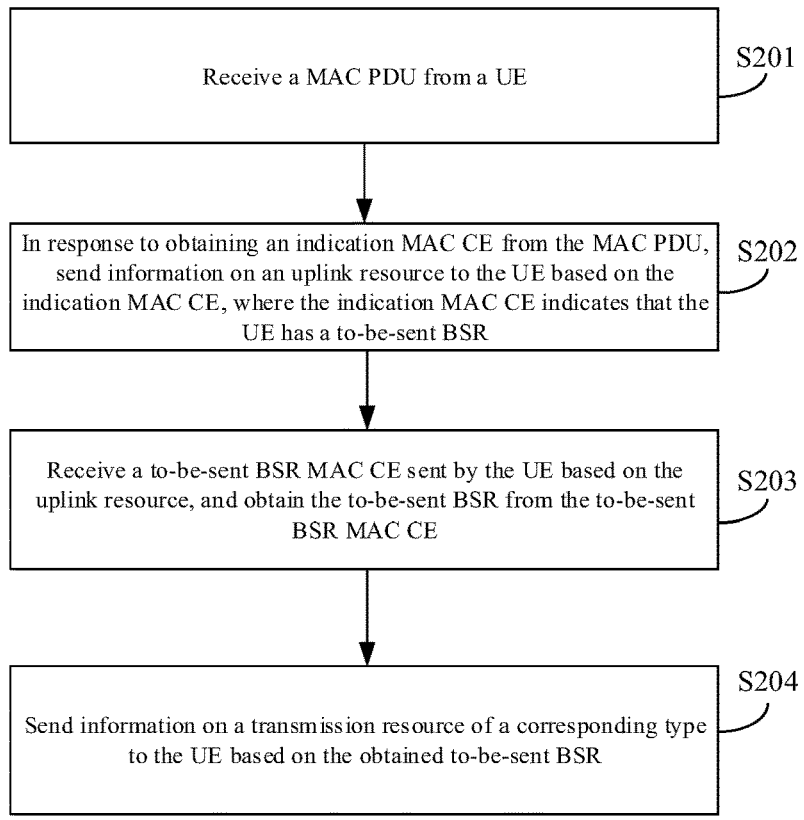
FIG. 2 is a flowchart illustrating a resource transmission method according to an exemplary embodiment of the present disclosure.

FIG. 2 is a flowchart illustrating a resource transmission method according to an exemplary embodiment of the present disclosure. This embodiment is described from the base station side. As shown in FIG. 2, the method includes the following.

At step S201, a MAC PDU is received from a UE.

At step S202, in response to obtaining an indication MAC CE from the MAC PDU, an information on uplink resource is sent to the UE based on the indication MAC CE, where the indication MAC CE indicates that the UE has a to-be-sent BSR.

The UE has the to-be-sent BSR is indicated by an MAC subheader corresponding to the indication MAC CE and including a preset logical channel identifier (LCID). A length of the indication MAC CE may be zero bit. The preset LCID may be set to, for example, LCID 10 according to actual requirements.

At step S203, a to-be-sent BSR MAC CE sent by the UE based on the uplink resource is received, and the to-be-sent BSR is obtained from the to-be-sent BSR MAC CE.

At step S204, information on a transmission resource of a corresponding type is sent to the UE based on the obtained to-be-sent BSR.

The resource for sidelink transmission may be scheduled for the UE based on the obtained sidelink BSR, or the resource for uplink transmission may be scheduled for the UE based on the obtained uplink BSR.

In the above embodiment, a base station obtains an indication MAC CE from a MAC PDU and sends information on an uplink resource to a UE based on the indication MAC CE, such that the UE may send a to-be-sent BSR MAC CE to the base station based on the uplink resource and the base station may send information on a transmission resource of a corresponding type to the UE based on a to-be-sent BSR. In this way, the UE may send data based on the transmission resource, thereby reducing data transmission delay.

Figure 3:
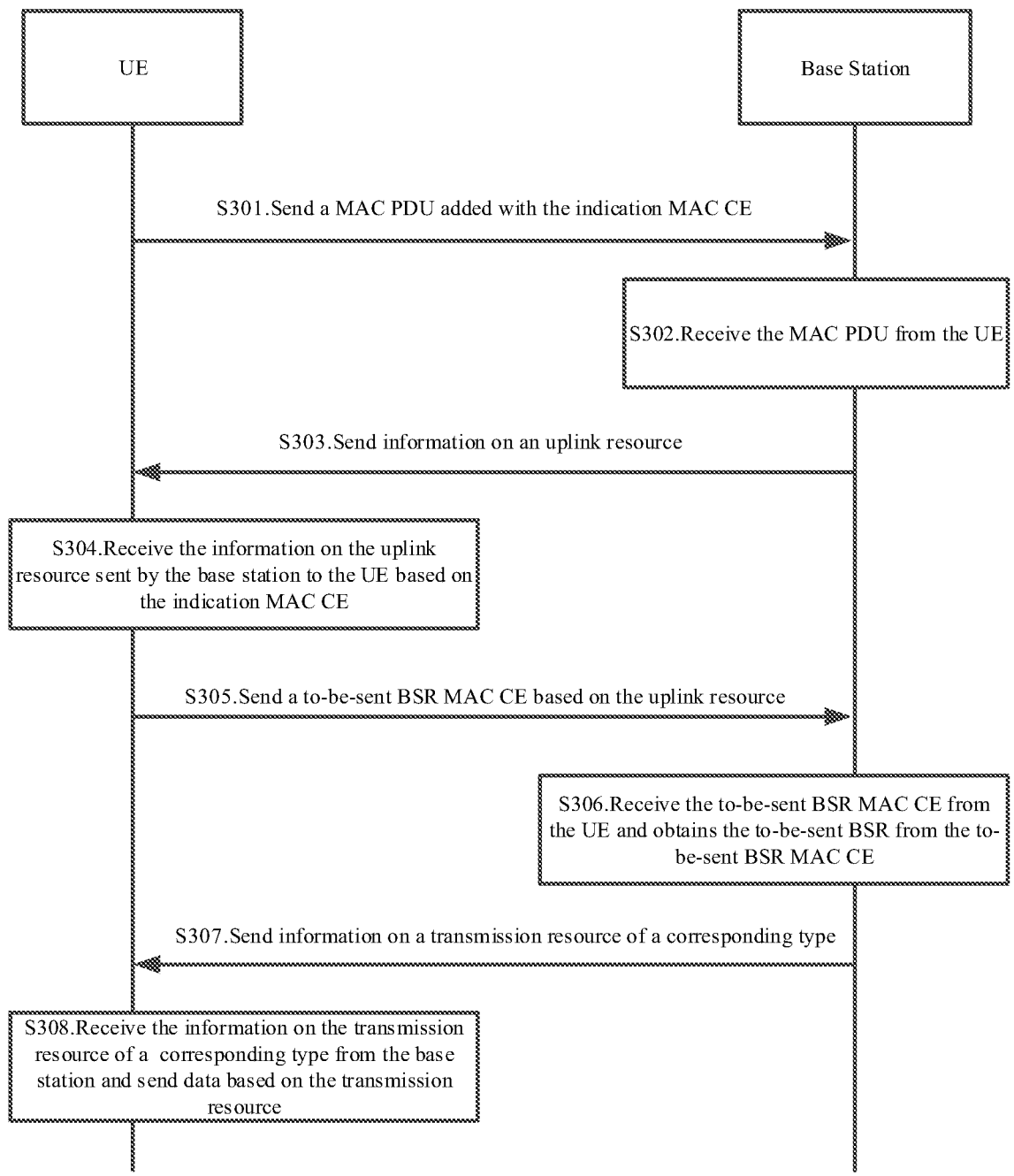
FIG. 3 is a signaling flowchart illustrating a resource transmission method according to an exemplary embodiment of the present disclosure.

FIG. 3 is a signaling flowchart illustrating a resource transmission method according to an exemplary embodiment of the present disclosure. This embodiment is described from the perspective of interaction between a base station and a UE. As shown in FIG. 3, the method includes the following.

At step S301, when a to-be-sent first BSR and a to-be-sent second BSR are present at the same time, in response to determining that an uplink MAC PDU is incapable of carrying both a first BSR MAC CE and a second BSR MAC CE at the same time, an indication MAC CE is added to the uplink MAC PDU and the MAC PDU added with the indication MAC CE is sent to a base station, where the indication MAC CE indicates that a UE has a to-be-sent BSR. The first BSR MAC CE is a MAC CE carrying the first BSR, and the second BSR MAC CE is a MAC CE carrying the second BSR.

At step S302, the base station receives the MAC PDU from the UE.

At step S303, the base station obtains the indication MAC CE from the MAC PDU, and sends information on an uplink resource to the UE based on the indication MAC CE.

At step S304, the UE receives the information on the uplink resource sent by the base station to the UE based on the indication MAC CE.

At step S305, the UE sends a to-be-sent BSR MAC CE to the base station based on the uplink resource.

At step S306, the base station receives the to-be-sent BSR MAC CE from the UE and obtains the to-be-sent BSR from the to-be-sent BSR MAC CE.

At step S307, the base station sends information on a transmission resource of a corresponding type to the UE based on the to-be-sent BSR.

At step S308, the UE receives the information on the transmission resource of a corresponding type from the base station and sends data based on the transmission resource.

Application Example 1

It is assumed that, the UE has a Uu logical channel 1 and a sidelink logical channel 1; the priority of the Uu logical channel 1 is 1, and a logical channel group to which the Uu logical channel 1 belongs is 1; the priority of the sidelink logical channel 1 is 2, and a sidelink logical channel group to which the sidelink logical channel 1 belongs is 1, where the priority 2 is higher than the priority 1.

When the coming data of the Uu logical channel 1 is 1 kb and the coming data of the sidelink logical channel 1 is 1 kb, the UE requests an uplink transmission resource from the base station, and the base station schedules the uplink transmission resource to the UE. After receiving the uplink transmission resource, the UE starts assembling the MAC PDU and places the sidelink BSR into the MAC PDU preferentially based on a priority of the logical channel for triggering the BSR. If a remaining space of the MAC PDU is insufficient to carry the uplink BSR MAC CE, an indication MAC CE is added to the uplink MAC PDU. Then, the UE sends the MAC PDU to the base station. The base station schedules a sidelink transmission resource capable of carrying 1 kb of data to the UE and schedules an uplink transmission resource to the UE based on the indication MAC CE. After receiving the uplink transmission resource, the UE starts assembling the MAC PDU and places the uplink BSR into the MAC PDU and then sends it to the base station. The base station schedules the uplink transmission resource capable of carrying 1 kb of data to the UE based on the BSR, such that the UE can send data through the uplink transmission resource, thus reducing data transmission delay.

Application Example 2

It is assumed that, the UE has a Uu logical channel 1 and a sidelink logical channel 1; the priority of the Uu logical channel 1 is 2, and a logical channel group to which the Uu logical channel 1 belongs is 1; the priority of the sidelink logical channel 1 is 1, and a sidelink logical channel group to which the sidelink logical channel 1 belongs is 1, where the priority 2 is higher than the priority 1.

When the coming data of the Uu logical channel 1 is 1 kb and the coming data of the sidelink logical channel 1 is 1 kb, the UE requests an uplink transmission resource from the base station, and the base station schedules an uplink transmission resource capable of carrying 1 kb of data to the UE. After receiving the uplink transmission resource, the UE starts assembling the MAC PDU and finds the uplink resource can carry the Uu to-be-sent data and thus places 1 kb of Uu data into the MAC PDU. If a remaining space of the MAC PDU is insufficient to carry the sidelink BSR, an indication MAC CE is added to the uplink MAC PDU. Then, the UE sends the MAC PDU to the base station. The base station schedules an uplink transmission resource to the UE based on the indication MAC CE. After receiving the uplink transmission resource, the UE starts assembling the MAC PDU and places the sidelink BSR into the MAC PDU and then sends it to the base station. The base station schedules a sidelink transmission resource capable of carrying 1 kb of data to the UE based on the sidelink BSR, such that the UE can send data through the uplink transmission resource, thus reducing data transmission delay.

In the above embodiment, with an interaction between a base station and a UE, the base station may obtain an indication MAC CE from a MAC PDU and schedule an uplink resource for the UE based on the indication MAC CE, such that the UE may send a category of to-be-sent BSR MAC CE to the base station based on the uplink resource. In this way, the base station schedules a transmission resource of a corresponding type for the UE based on a to-be-sent BSR, such that the UE sends data based on the transmission resource, thereby reducing data transmission delay.

Figure 4:
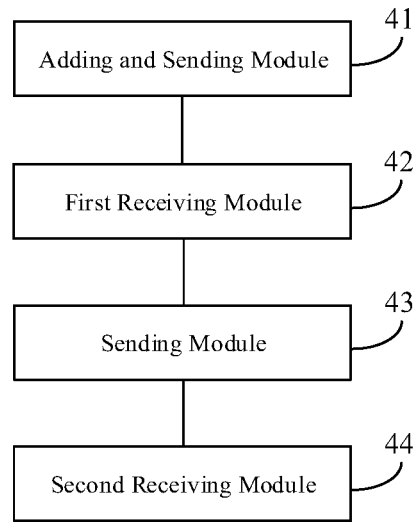
FIG. 4 is a block diagram illustrating a buffer indication apparatus according to an exemplary embodiment of the present disclosure.

FIG. 4 is a block diagram illustrating a buffer indication apparatus according to an exemplary embodiment of the present disclosure. The apparatus may be located in a UE. As shown in FIG. 4, the apparatus includes the following modules.

An adding and sending module 41 is configured to, when a to-be-sent first buffer state report (BSR) and a to-be-sent second BSR are present at the same time, in response to determining that an uplink media access control (MAC) protocol data unit (PDU) is incapable of carrying both a first BSR MAC control element (CE) and a second BSR MAC CE at the same time, add an indication MAC CE in the uplink MAC PDU and send the MAC PDU added with the indication MAC CE to a base station, where the indication MAC CE indicates that a UE has a to-be-sent BSR. The first BSR MAC CE is a MAC CE carrying the first BSR, and the second BSR MAC CE is a MAC CE carrying the second BSR.

The to-be-sent BSR may include the first BSR or the second BSR. The first BSR may be a sidelink BSR or an uplink BSR. When the first BSR is a sidelink BSR, the second BSR is an uplink BSR. When the first BSR is an uplink BSR, the second BSR is a sidelink BSR.

In this embodiment, based on a descending order of priorities of logical channels for triggering the first BSR and the second BSR, a corresponding MAC CE may be added to the MAC PDU. If a space of the MAC PDU is insufficient to carry both the first BSR MAC CE and the second BSR MAC CE at the same time, determining that the MAC PDU is incapable of carrying both the first BSR MAC CE and the second BSR MAC CE at the same time.

In this embodiment, in response to determining that the MAC PDU is incapable of carrying both the first BSR MAC CE and the second BSR MAC CE at the same time, an indication MAC CE is added to the uplink MAC PDU, where the indication MAC CE indicates that the UE has a to-be-sent BSR.

The UE has the to-be-sent BSR is indicated by a MAC subheader corresponding to the indication MAC CE and including a preset logical channel identifier (LCID). A length of the indication MAC CE may be zero bit. The preset LCID may be set to, for example, LCID 10 according to actual requirements.

A first receiving module 42 is configured to receive information on an uplink resource (uplink resource information for short) sent by the base station to the UE based on the indication MAC CE added by the adding and sending module 41.

After receiving the MAC PDU, the base station obtains the indication MAC CE from the MAC PDU, detects that the UE has the to-be-sent BSR based on the indication MAC CE, and schedules an uplink resource for the UE, the uplink resource may include an uplink resource for transmitting the to-be-sent BSR. Further, after receiving the MAC PDU, the base station obtains the first BSR or the second BSR from the MAC PDU. The base station schedules a corresponding type of transmission resource for the UE based on the obtained first BSR or second BSR, and notifies the UE of information of the scheduled transmission resource.

A sending module 43 is configured to send a to-be-sent BSR MAC CE to the base station based on the uplink resource corresponding to the uplink resource information received by the first receiving module 42.

In this embodiment, if the to-be-sent BSR MAC CE is the first BSR MAC CE, after the uplink resource information is received from the base station, the first BSR MAC CE is sent to the base station based on the uplink resource which is scheduled for transmitting the first BSR MAC CE and is indicated by the uplink resource information. If the to-be-sent BSR MAC CE is the second BSR MAC CE, after the uplink resource information is received from the base station, the second BSR MAC CE is sent to the base station based on the uplink resource which is scheduled for transmitting the second BSR MAC CE and is indicated by the uplink resource information.

A second receiving module 44 is configured to receive information on a transmission resource of a corresponding type sent by the base station to the UE based on the to-be-sent BSR sent by the sending module 43.

In this embodiment, if the to-be-sent BSR is a sidelink BSR, the received information on transmission resource of a corresponding type is information corresponding to a transmission resource scheduled for sidelink transmission by the base station. If the to-be-sent BSR is an uplink BSR, the received information on transmission resource of a corresponding type is information corresponding to a transmission resource scheduled for uplink transmission by the base station.

In this above embodiment, when a to-be-sent first BSR and a to-be-sent second BSR are present at the same time, in response to determining that an uplink MAC PDU is incapable of carrying both a first BSR MAC CE and a second BSR MAC CE at the same time, an indication MAC CE is added to the uplink MAC PDU and the MAC PDU added with the indication MAC CE is sent to a base station. In this way, the base station may schedule an uplink resource for a UE based on the indication MAC CE, and the UE may send a to-be-sent BSR MAC CE to the base station based on the uplink resource, and thus the base station may send information on a scheduled transmission resource of a corresponding type to the UE based on a to-be-sent BSR, thereby reducing data transmission delay.

Figure 5:
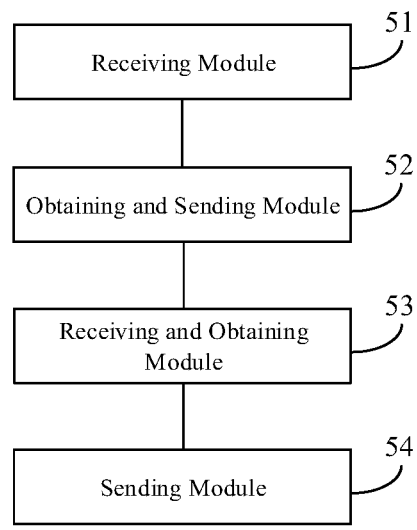
FIG. 5 is a block diagram illustrating a resource transmission apparatus according to an exemplary embodiment of the present disclosure.

FIG. 5 is a block diagram illustrating a resource transmission apparatus according to an exemplary embodiment of the present disclosure. The apparatus may be located in a base station. As shown in FIG. 5, the apparatus includes the following modules.

A receiving module 51 is configured to receive a media access control (MAC) protocol data unit (PDU) from a user equipment (UE).

An obtaining and sending module 52 is configured to, in response to obtaining an indication MAC CE from the MAC PDU received by the receiving module 51, send information on an uplink resource to the UE based on the indication MAC CE, where the indication MAC CE indicates that the UE has a to-be-sent BSR.

A receiving and obtaining module 53 is configured to receive a to-be-sent BSR MAC CE sent by the UE based on the uplink resource sent by the obtaining and sending module 52, and obtain the to-be-sent BSR from the to-be-sent BSR MAC CE.

A sending module 54 is configured to send information on a transmission resource of a corresponding type to the UE based on the to-be-sent BSR obtained by the receiving and obtaining module 53.

The sidelink transmission resource may be scheduled for the UE based on the obtained sidelink BSR, or the uplink transmission resource may be scheduled for the UE based on the obtained uplink BSR.

In the above embodiment, a base station may obtain an indication MAC CE from a MAC PDU and schedule an uplink resource for a UE based on the indication MAC CE, such that the UE may send a to-be-sent BSR MAC CE to the base station based on the uplink resource and the base station may schedule a transmission resource of a corresponding type for the UE based on a to-be-sent BSR. In this way, the UE may send data based on the transmission resource, thereby reducing data transmission delay.

Figure 6:
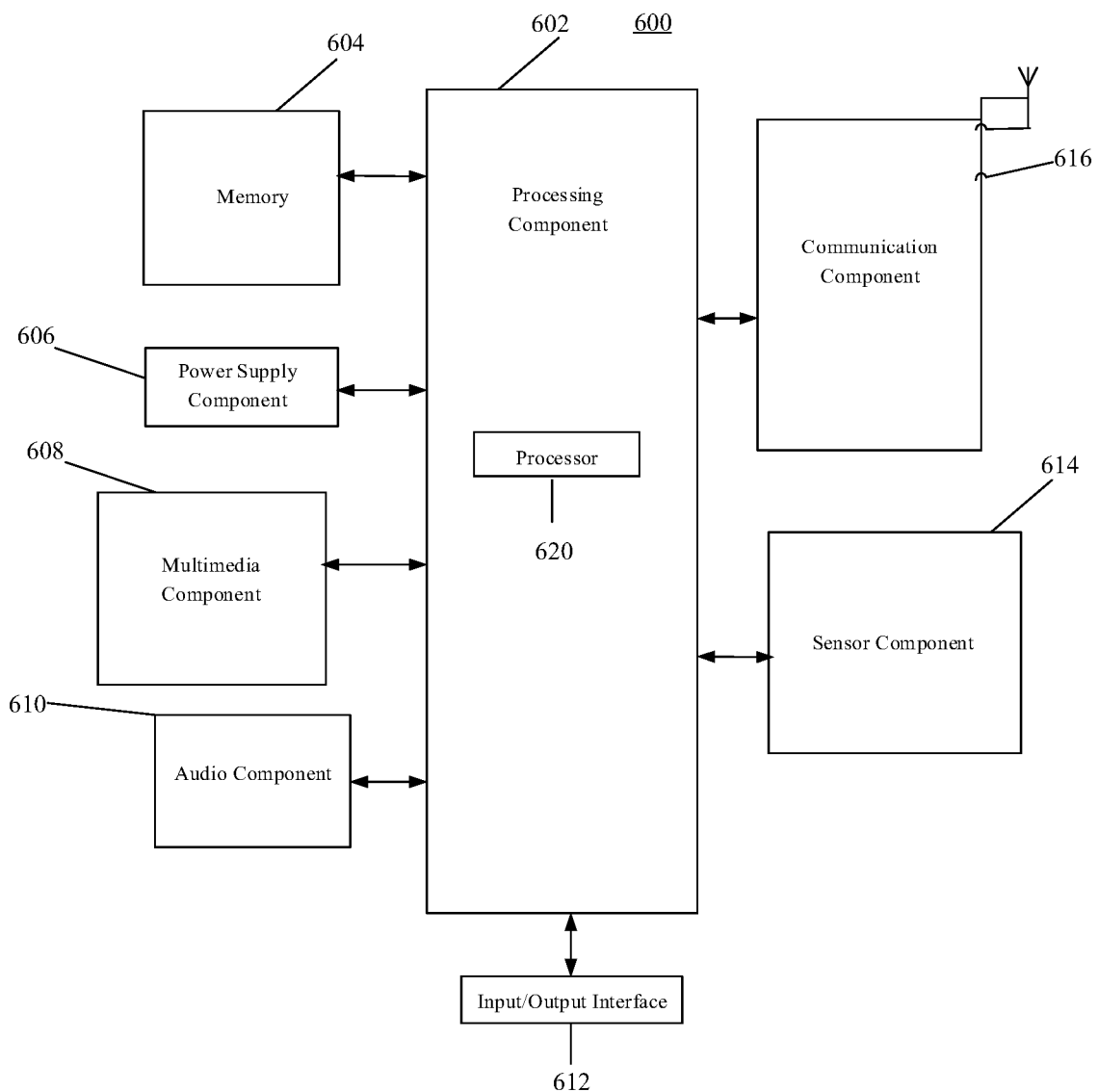
FIG. 6 is a block diagram applicable to a buffer indication apparatus according to an exemplary embodiment of the present disclosure.

FIG. 6 is a block diagram applicable to a buffer indication apparatus according to an exemplary embodiment of the present disclosure. For example, the apparatus 600 may be a mobile phone, a computer, a digital broadcast terminal, a message transceiving device, a game console, a tablet device, a medical device, a fitness device, a personal digital assistant, and the like.

As shown in FIG. 6, the apparatus 600 may include one or more of the following components: a processing component 602, a memory 604, a power supply component 606, a multimedia component 608, an audio component 610, an input/output (I/O) interface 612, a sensor component 614 and a communication component 616.

The processing component 602 generally controls overall operations of the apparatus 600, such as operations associated with display, phone calls, data communications, camera operations, and recording operations. The processing component 602 may include one or more processors 620 to execute instructions to complete all or part of the steps of the above methods. In addition, the processing component 602 may include one or more modules which facilitate the interaction between the processing component 602 and other components. For example, the processing component 602 may include a multimedia module to facilitate the interaction between the multimedia component 608 and the processing component 602.

One processor 620 of the processing component 602 may be configured to:
  when a to-be-sent first buffer state report (BSR) and a to-be-sent second BSR are present at the same time, in response to determining that an uplink media access control (MAC) protocol data unit (PDU) is incapable of carrying both a first BSR MAC control element (CE) and a second BSR MAC CE at the same time, add an indication MAC CE in the uplink MAC PDU and send the MAC PDU added with the indication MAC CE to a base station, where the indication MAC CE indicates that a UE has a to-be-sent BSR, the first BSR MAC CE is a MAC CE carrying the first BSR, and the second BSR MAC CE is a MAC CE carrying the second BSR;
  receive information on an uplink resource sent by the base station to the UE based on the indication MAC CE;
  send a to-be-sent BSR MAC CE to the base station based on the uplink resource;
  receive information on a transmission resource of a corresponding type sent by the base station to the UE based on a to-be-sent BSR.

The memory 604 is configured to store various types of data to support the operation of the apparatus 600. Examples of such data include instructions for any application or method operated on the apparatus 600, contact data, phonebook data, messages, pictures, videos, and so on. The memory 604 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 606 supplies power for different components of the apparatus 600. The power supply component 606 may include a power supply management system, one or more power supplies, and other components associated with generating, managing and distributing power for the apparatus 600.

The multimedia component 608 includes a screen that provides an output interface between the apparatus 600 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some embodiments, the multimedia component 608 includes a front camera and/or a rear camera. When the apparatus 600 is in an operation mode, such as a shooting mode or a video mode, the front camera and/or the rear camera may receive external multimedia data. Each of the front and rear cameras may be a fixed optical lens system or have a focal length and an optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, and a voice recognition mode. The received audio signal may be further stored in the memory 604 or transmitted via the communication component 616. In some embodiments, the audio component 610 also includes a loudspeaker for outputting an audio signal.

The I/O interface 612 provides an interface between the processing component 602 and a peripheral interface module which may be a keyboard, a click wheel, a button, or the like. These buttons may include, but are not limited to a home button, a volume button, a start button, and a lock button.

The sensor component 614 includes one or more sensors for providing a status assessment in various aspects to the apparatus 600. For example, the sensor component 614 may detect an open/closed state of the apparatus 600, and the relative positioning of components, for example, the component is a display and a keypad of the apparatus 600. The sensor component 614 may also detect a change in position of the apparatus 600 or a component of the apparatus 600, the presence or absence of a user in contact with the apparatus 600, the orientation or acceleration/deceleration of the apparatus 600 and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an acceleration sensor, a gyro sensor, a magnetic sensor, a pressure sensor, or a temperature sensor.

The communication component 616 is configured to facilitate wired or wireless communication between the apparatus 600 and other devices. The apparatus 600 may access a wireless network based on a communication standard, such as Wi-Fi, 2G or 3G, or a combination thereof. In an embodiment, the communication component 616 receives broadcast signals or broadcast associated information from an external broadcast management system via a broadcast channel. In an embodiment, the communication component 616 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the apparatus 600 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an embodiment, there is also provided a non-transitory computer readable storage medium including computer program instructions, such as a memory 604 including instructions, where the instructions are executable by the processor 620 of the apparatus 600 to perform the method as described above. For example, the non-transitory computer readable storage medium may be a ROM, a RAM, a CD-ROM, a magnetic tape, a floppy disk, an optical data storage device, and the like.

Figure 7:
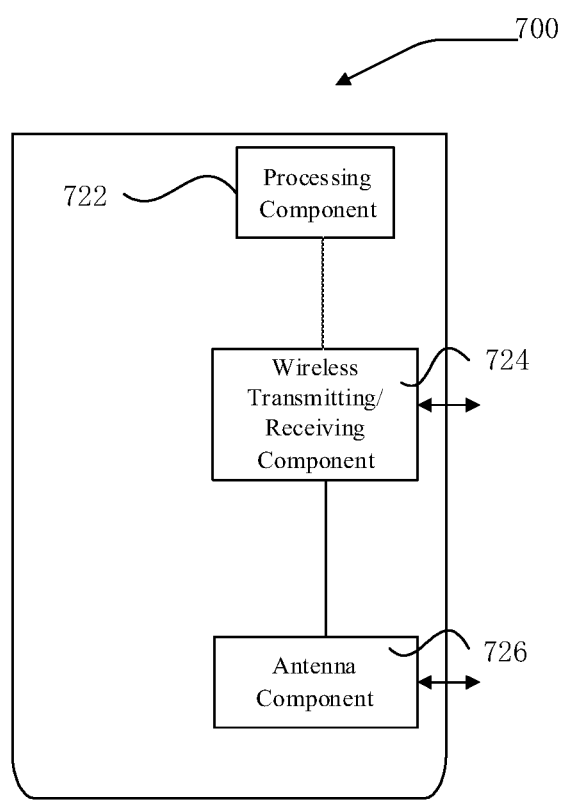
FIG. 7 is a block diagram applicable to a resource transmission apparatus according to an exemplary embodiment of the present disclosure.

FIG. 7 is another block diagram applicable to a resource transmission apparatus according to an embodiment of the present disclosure. The apparatus 700 may be provided as a base station. As shown in FIG. 7, the apparatus 700 includes a processing component 722, a wireless transmitting/receiving component 724, an antenna component 726, and a signal processing part specific to a wireless interface. The processing component 722 may further include one or more processors.

One processor of the processing component 722 may be configured to:
  receive a media access control (MAC) protocol data unit (PDU) from a user equipment (UE);
  in response to obtaining an indication MAC control element (CE) from the MAC PDU, send information on an uplink resource to the UE based on the indication MAC CE, where the indication MAC CE indicates that a UE has a to-be-sent BSR;
  receive a to-be-sent BSR MAC CE sent by the UE based on the uplink resource, and obtain the to-be-sent BSR from the to-be-sent BSR MAC CE;
  send information on a transmission resource of a corresponding type to the UE based on the obtained to-be-sent BSR.

In an embodiment, there is also provided a non-transitory computer readable storage medium including instructions, where the instructions are executed by the processing component 722 of the apparatus 700 to perform the resource transmission method as described above. For example, the non-transitory computer readable storage medium may be a ROM, a RAM, a CD-ROM, a magnetic tape, a floppy disk, an optical data storage device, and the like.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A buffer indication method, being applied to a user equipment (UE), and comprising:
  when a to-be-sent first buffer state report (BSR) and a to-be-sent second BSR are present at the same time, in response to determining that an uplink media access control (MAC) protocol data unit (PDU) is incapable of carrying both a first BSR MAC control element (CE) and a second BSR MAC CE at the same time, adding an indication MAC CE to the uplink MAC PDU and sending the MAC PDU added with the indication MAC CE to a base station, wherein the indication MAC CE indicates that the UE has a to-be-sent BSR, the first BSR MAC CE carries the first BSR, and the second BSR MAC CE carries the second BSR,
  wherein the to-be-sent BSR comprises the first BSR or the second BSR; when the first BSR is a sidelink BSR, the second BSR is an uplink BSR; or when the first BSR is an uplink BSR, the second BSR is a sidelink BSR;

receiving information on an uplink resource sent by the base station to the UE based on the indication MAC CE;

sending a to-be-sent BSR MAC CE to the base station based on the uplink resource, wherein the to-be-sent BSR MAC CE carries the to-be-sent BSR; and receiving information on a transmission resource of a corresponding type sent by the base station to the UE based on the to-be-sent BSR.

2. The method of claim 1, wherein determining that the uplink MAC PDU is incapable of carrying both the first BSR MAC CE and the second BSR MAC CE at the same time comprises:

based on a descending order of priorities of logical channels for triggering the first BSR and the second BSR, adding a corresponding MAC CE to the MAC PDU; and in response to determining that a space of the MAC PDU is insufficient to carry both the first BSR MAC CE and the second BSR MAC CE at the same time, determining that the MAC PDU is incapable of carrying both the first BSR MAC CE and the second BSR MAC CE at the same time.

3. The method of claim 1, wherein the UE having the to-be-sent BSR is indicated by a MAC subheader corresponding to the indication MAC CE and comprising a preset logical channel identifier (LCID).

4. A resource transmission method, being applied to a base station, and comprising:

receiving a media access control (MAC) protocol data unit (PDU) from a user equipment (UE);

in response to obtaining an indication MAC control element (CE) from the MAC PDU, sending information on an uplink resource to the UE based on the indication MAC CE, wherein the indication MAC CE indicates that the UE has a to-be-sent buffer state report (BSR), wherein the to-be-sent BSR comprises a first BSR or a second BSR; when the first BSR is a sidelink BSR, the second BSR is an uplink BSR; or when the first BSR is an uplink BSR, the second BSR is a sidelink BSR;

receiving a to-be-sent BSR MAC CE sent by the UE based on the uplink resource, and obtaining the to-be-sent BSR from the to-be-sent BSR MAC CE; and sending information on a transmission resource of a corresponding type to the UE based on the obtained to-be-sent BSR.

5. The method of claim 4, wherein the UE having the to-be-sent BSR is indicated by a MAC subheader corresponding to the indication MAC CE and comprising a preset logical channel identifier (LCID).

6. A user equipment (UE), comprising:
a processor; and
a memory storing instructions executable by the processor;
wherein the processor is configured to:
when a to-be-sent first buffer state report (BSR) and a to-be-sent second BSR are present at the same time, in response to determining that an uplink media access control (MAC) protocol data unit (PDU) is incapable of carrying both a first BSR MAC control element (CE) and a second BSR MAC CE at the same time, add an indication MAC CE in the uplink MAC PDU and send the MAC PDU added with the indication MAC CE to a base station, wherein the indication MAC CE indicates that the UE has a to-be-sent BSR, the first BSR MAC CE carries the first BSR, and the second BSR MAC CE carries the second BSR, wherein the to-be-sent BSR comprises the first BSR or the second BSR; when the first BSR is a sidelink BSR, the second BSR is an uplink BSR; or when the first BSR is an uplink BSR, the second BSR is a sidelink BSR;

receive information on an uplink resource sent by the base station to the UE based on the indication MAC CE;

based on the uplink resource, send a to-be-sent BSR MAC CE to the base station, wherein the to-be-sent BSR MAC CE carries the to-be-sent BSR; and receive information on a transmission resource of a corresponding type sent by the base station to the UE based on the to-be-sent BSR.

7. The user equipment of claim 6, wherein determining that the uplink MAC PDU is incapable of carrying both the first BSR MAC CE and the second BSR MAC CE at the same time comprises:

based on a descending order of priorities of logical channels for triggering the first BSR and the second BSR, adding a corresponding MAC CE to the MAC PDU; and in response to determining that a space of the MAC PDU is insufficient to carry both the first BSR MAC CE and the second BSR MAC CE at the same time, determining that the MAC PDU is incapable of carrying both the first BSR MAC CE and the second BSR MAC CE at the same time.

8. The user equipment of claim 6, wherein the UE having the to-be-sent BSR is indicated by a MAC subheader corresponding to the indication MAC CE and comprising a preset logical channel identifier (LCID).

9. A base station, comprising:
a processor; and
a memory storing instructions executable by the processor;
wherein the instructions are executed by the processor to implement the resource transmission method according to claim 4.

10. The base station of claim 9, wherein the UE having the to-be-sent BSR is indicated by a MAC subheader corresponding to the indication MAC CE and comprising a preset logical channel identifier (LCID).

11. A non-transitory computer readable storage medium, storing computer instructions thereon, wherein the computer instructions are executed by a processor to implement the buffer indication method according to claim 1.

12. A non-transitory computer readable storage medium, storing computer instructions thereon, wherein the computer instructions are executed by a processor to implement the resource transmission method according to claim 4.

* * * * *